(12) United States Patent
Fume et al.

(10) Patent No.: US 11,176,943 B2
(45) Date of Patent: Nov. 16, 2021

(54) VOICE RECOGNITION DEVICE, VOICE RECOGNITION METHOD, AND COMPUTER PROGRAM PRODUCT

(71) Applicant: Kabushiki Kaisha Toshiba, Tokyo (JP)

(72) Inventors: Kosei Fume, Kawasaki Kanagawa (JP); Masahiro Yamamoto, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 272 days.

(21) Appl. No.: 15/896,677

(22) Filed: Feb. 14, 2018

(65) Prior Publication Data
US 2019/0088258 A1    Mar. 21, 2019

(30) Foreign Application Priority Data
Sep. 21, 2017    (JP) .............................. JP2017-180965

(51) Int. Cl.
G10L 15/26    (2006.01)
G10L 15/08    (2006.01)
G10L 15/02    (2006.01)
G10L 25/78    (2013.01)
(Continued)

(52) U.S. Cl.
CPC .............. *G10L 15/26* (2013.01); *G06F 40/10* (2020.01); *G10L 15/02* (2013.01); *G10L 15/08* (2013.01);
(Continued)

(58) Field of Classification Search
CPC ....... G10L 15/26; G10L 15/30; G10L 15/265; G10L 15/1807; G06F 17/2705; G06F 16/3344; G06F 16/7844
See application file for complete search history.

(56) References Cited

U.S. PATENT DOCUMENTS

2010/0292989 A1* 11/2010 Kitade .................... G10L 15/26
                                                                    704/255
2012/0078629 A1*  3/2012 Ikeda .................. G10L 15/1807
                                                                    704/235
(Continued)

FOREIGN PATENT DOCUMENTS

JP          2004-072310           3/2004
JP          2005-309065          11/2005
(Continued)

*Primary Examiner* — Richemond Dorvil
*Assistant Examiner* — Mark Villena
(74) *Attorney, Agent, or Firm* — Knobbe, Martens, Olson & Bear LLP

(57) ABSTRACT

According to an embodiment, a voice recognition device includes one or more processors. The one or more processors are configured to: recognize a voice signal representing a voice uttered by an object speaker, to generate text and meta information representing information that is not included in the text and included in the voice signal; generate an object presentation vector including a plurality of parameters representing a feature of a presentation uttered by the object speaker; calculate a similarity between the object presentation vector and a reference presentation vector including a plurality of parameters representing a feature of a presentation uttered by a reference speaker; and output the text. The one or more processors are further configured to determine whether to output the meta information based on the similarity, and upon determining to output the meta information, add the meta information to the text and output the meta information.

20 Claims, 9 Drawing Sheets

(51) Int. Cl.
*G10L 25/90* (2013.01)
*G10L 25/51* (2013.01)
*G10L 25/48* (2013.01)
*G06F 40/10* (2020.01)
*G09B 21/00* (2006.01)

(52) U.S. Cl.
CPC .............. *G10L 25/48* (2013.01); *G10L 25/51* (2013.01); *G10L 25/78* (2013.01); *G10L 25/90* (2013.01); *G09B 21/009* (2013.01)

(56) References Cited

U.S. PATENT DOCUMENTS

| | | | | |
|---|---|---|---|---|
| 2013/0054718 | A1* | 2/2013 | Davies | H04L 12/6418 |
| | | | | 709/206 |
| 2013/0165086 | A1* | 6/2013 | Doulton | H04M 3/53316 |
| | | | | 455/414.4 |
| 2014/0052441 | A1 | 2/2014 | Fujibayashi | |
| 2014/0297281 | A1* | 10/2014 | Togawa | G10L 15/22 |
| | | | | 704/251 |
| 2015/0341486 | A1* | 11/2015 | Knighton | G10L 15/26 |
| | | | | 455/414.1 |
| 2017/0270086 | A1 | 9/2017 | Fume et al. | |
| 2017/0270949 | A1 | 9/2017 | Fume et al. | |
| 2018/0075839 | A1 | 3/2018 | Fume et al. | |

FOREIGN PATENT DOCUMENTS

| | | |
|---|---|---|
| JP | 2009-187349 | 8/2009 |
| JP | 2015-158582 | 9/2015 |
| JP | 2017-167368 | 9/2017 |
| JP | 2017-167433 | 9/2017 |
| JP | 2018-044993 A | 3/2018 |
| WO | WO 2012/147274 | 11/2012 |

* cited by examiner

FIG.7

I WILL EXPLAIN RELATION BETWEEN MARKET AND A COMMODITY (LOUD VOICE)

SALES PERFORMANCE OF NECESSITIES OF LIFE IS HARDLY INFLUENCED BY MARKET
SALES PERFORMANCE OF AUTOMOBILES IS xxxxxxxx INFLUENCED BY MARKET
(UNCLEAR BECAUSE OF RAPID SPEECH)

(QUOTATION FROM MATERIAL)

> LIST OF COMMODITIES SALES PERFORMANCE OF WHICH IS EASILY INFLUENCED BY MARKET
>
> AUTOMOBILE
> JEWEL
> SIGHTSEEING

MARKET IS ... (SILENCE) ... VERY SLOW RECENTLY

THUS, UH, YOU CAN PROBABLY MAKE PROFIT BY SELLING xxxxxxxxxx
(UNCLEAR BECAUSE OF LOW VOICE)

VOICE RECOGNITION DEVICE, VOICE RECOGNITION METHOD, AND COMPUTER PROGRAM PRODUCT

CROSS-REFERENCE TO RELATED APPLICATIONS

This application is based upon and claims the benefit of priority from Japanese Patent Application No. 2017-180965, filed on Sep. 21, 2017; the entire contents of which are incorporated herein by reference.

FIELD

Embodiments described herein relate generally to a voice recognition device, a voice recognition method, and a computer program product.

BACKGROUND

In recent years, voice recognition devices can manage a large-scale corpus and a complicated and enormous model as available calculator resources are expanded. Accordingly, the voice recognition device can recognize colloquial expressions, continuous utterances, and the like that have been hardly recognized in the related art, with practical accuracy in real time. Such a real-time voice recognition device can be applied to an interface between a human and a machine such as a conversation system. The real-time voice recognition device can also be applied to an automatic recognition device that transcribes and summarizes a voice signal.

The real-time voice recognition device can also be applied to what is called a "tool for guaranteeing information accessibility for the disabled" for supporting understanding of a hearing-impaired person. Furthermore, the real-time voice recognition device can be applied to an information providing device for providing information to audiences in a speech in a seminar, the field of education, a lecture, or the like.

As described above, the real-time voice recognition device is applied to various scenes. However, required accuracy and content of the real-time voice recognition device are different depending on a scene to which it is applied. For example, when the real-time voice recognition device is applied to transcription, summarization, and the like of the voice signal, there is little need for outputting information about a feature about how a speaker speaks (for example, utterance volume and utterance speed). However, for example, in a case of supporting understanding of a hearing-impaired person or guaranteeing information accessibility for audiences of a seminar and the like, the real-time voice recognition device preferably outputs information such as a condition and feelings of the speaker together with text to lend realism.

However, in the related art, it has been difficult for the real-time voice recognition device to appropriately output information not included in the text such as a condition and feelings of the speaker.

BRIEF DESCRIPTION OF THE DRAWINGS

FIG. 7 is a diagram illustrating a display example of text, meta information, and a relevant region of the material data;

DETAILED DESCRIPTION

Figure 1:
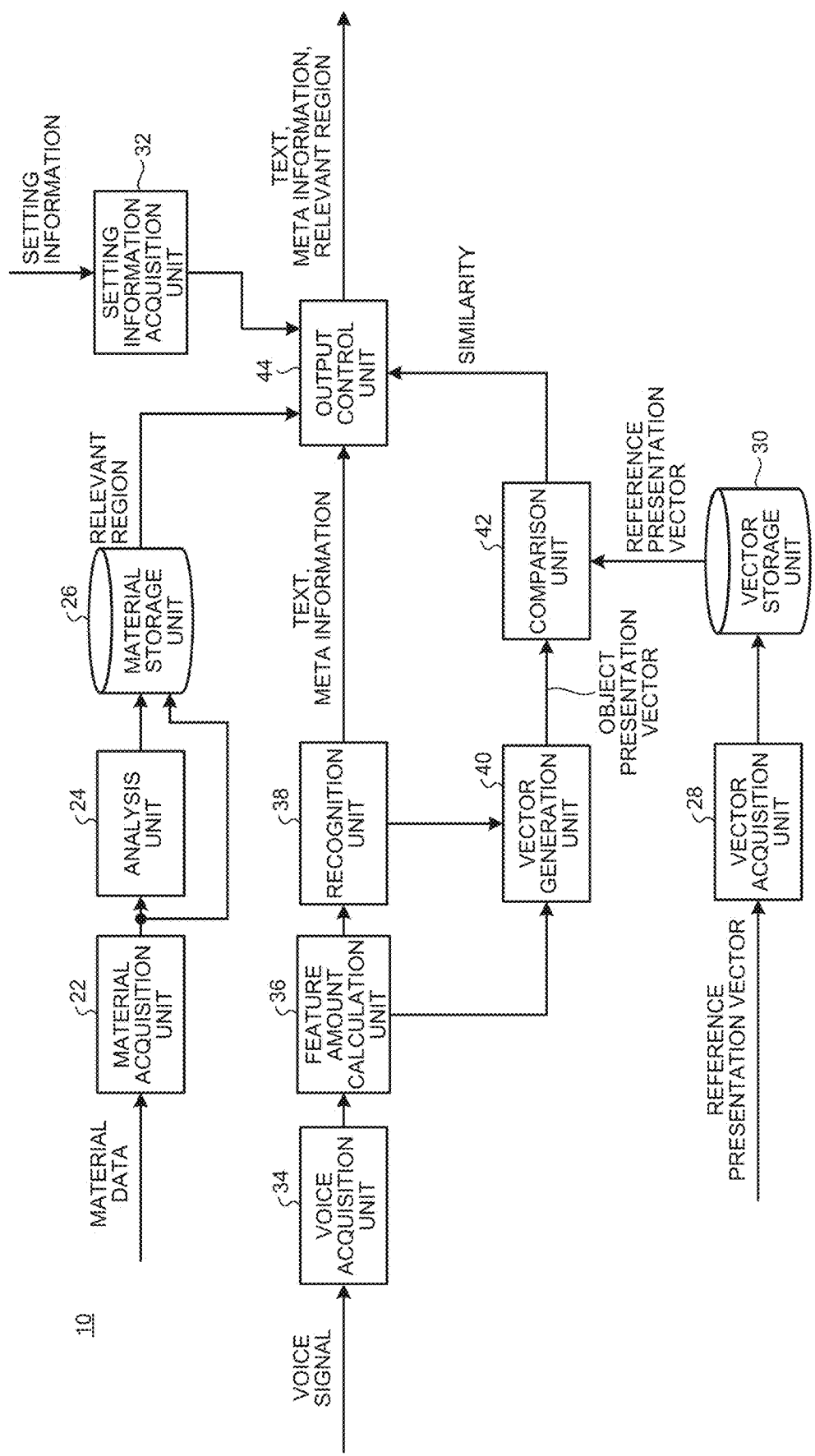
FIG. 1 is a diagram illustrating a configuration of a voice recognition device according to an embodiment.

According to an embodiment, a voice recognition device includes one or more processors. The one or more processors are configured to: recognize a voice signal representing a voice uttered by an object speaker, to generate text and meta information representing information that is not included in the text and included in the voice signal; generate an object presentation vector including a plurality of parameters representing a feature of a presentation uttered by the object speaker based on the voice signal, the text, and the meta information; calculate a similarity between the object presentation vector and a reference presentation vector including a plurality of parameters representing a feature of a presentation uttered by a reference speaker; and output the text. The one or more processors are further configured to determine whether to output the meta information based on the similarity, and upon determining to output the meta information, add the meta information to the text and output the meta information with the text.

The following describes an embodiment in detail with reference to the drawings. A voice recognition device 10 according to the present embodiment recognizes a voice signal representing a voice uttered by an object speaker, and outputs text obtained by recognition. The voice recognition device 10 adds meta information to the text and outputs the meta information with the text as needed. Additionally, the voice recognition device 10 adds relevant region of material data acquired in advance to the text and outputs the relevant region with the text as needed.

The meta information represents, for example, information included in the voice signal and not included in the text. For example, the meta information is information representing a volume of the voice signal, utterance speed, and feelings, a filler, stammering, hesitation in saying, laziness in saying, a silence period, and the like of the object speaker detected from the voice signal.

The material data is, for example, data including the text. The material data may include an image or a moving image. The material data may be data in which a computer program is described. The material data may be data stored in a recording medium or data stored in a server on a network. A file format of the material data may be any file format that can be managed by the voice recognition device 10.

The voice recognition device 10 is, for example, applied to a conversation system that mediates a conversation between persons. For example, the voice recognition device 10 may be applied to a device for recording, as text, content or summary of the voice signal representing the voice uttered by the object speaker. For example, the voice recognition device 10 may also be applied to a tool for guaranteeing information accessibility for the disabled for notifying a hearing-impaired person of content of the utterance of the object speaker. For example, the voice recognition device 10 may also be applied to an information providing device for providing video and a voice of a lecturer of a seminar and the like to people who attend the seminar.

FIG. 1 is a diagram illustrating a configuration of the voice recognition device 10 according to the embodiment. The voice recognition device 10 includes a material acquisition unit 22, an analysis unit 24, a material storage unit 26, a vector acquisition unit 28, a vector storage unit 30, a setting information acquisition unit 32, a voice acquisition unit 34, a feature amount calculation unit 36, a recognition unit 38, a vector generation unit 40, a comparison unit 42, and an output control unit 44.

The material acquisition unit 22 acquires material data related to the voice uttered by the object speaker in advance. For example, the material acquisition unit 22 reads data obtained by electronizing materials, proceedings, and the like prepared by the object speaker in advance from a server or the like via a recording medium or a network. The material acquisition unit 22 may acquire information related to the voice uttered by the object speaker from the server by searching the Internet and the like.

The analysis unit 24 analyzes a structure of the acquired material data. The analysis unit 24 divides, in accordance with the analysis result, the material data into a plurality of regions that can be added to the text and output. The analysis unit 24 extracts, for each of the regions, text representing content thereof. The analysis unit 24 identifies, for each of the regions, a position in the material data (a file name, a page number, a row number, identification information representing whether the region is a title or a body, and the like). The analysis unit 24 generates a search index for each of the regions. The analysis unit 24 then generates, for each of the regions, region information including the text, the position, and the index.

The material storage unit 26 stores therein the material data acquired by the material acquisition unit 22 and the region information of the respective regions generated by the analysis unit 24.

The vector acquisition unit 28 acquires, in advance, a reference presentation vector generated by another device or generated by the voice recognition device 10. The vector storage unit 30 stores therein the acquired reference presentation vector.

The reference presentation vector includes a plurality of parameters representing a feature of a presentation uttered by a reference speaker. For example, when the voice recognition device 10 is applied to an information providing device for providing video and a voice of a lecturer of a seminar to people who attend the seminar, the reference presentation vector includes a plurality of parameters representing a feature of a presentation uttered by an experienced lecturer.

Each of the plurality of parameters included in the reference presentation vector is a value calculated through predetermined processing based on the voice signal uttered by the reference speaker, and the text or the meta information obtained by recognizing the voice signal uttered by the reference speaker. The reference presentation vector includes a plurality of parameters of a predetermined type in a predetermined format.

For example, the plurality of parameters include information obtained by analyzing an acoustic feature amount of the voice signal uttered by the reference speaker. For example, the plurality of parameters include at least one of a basic frequency, a dynamic range, a volume, utterance speed, a silent period length, pitch, and a Mel-Frequency Cepstrum Coefficient of the voice signal. The plurality of parameters may include at least one of evaluation values representing stability of utterance speed, stability of a sound volume, smoothness of speech, clearness of voice, a generation rate of silence, and unnaturalness of intonation that are calculated using at least one of a basic frequency, a dynamic range, a volume, utterance speed, a silent period length, pitch, and a Mel-Frequency Cepstrum Coefficient of the voice signal.

For example, the plurality of parameters include information obtained by analyzing the text or the meta information obtained by recognizing the voice signal uttered by the reference speaker. For example, the plurality of parameters include a value representing a generation rate or a generation pattern of at least one of a coherent sentence that is easy to understand, a filler, an unknown word, stammering, hesitation in saying, laziness in saying, and an onomatopoetic word. The plurality of parameters may include at least one of a generation rate of a technical term, a generation rate of repetition, and a generation rate of digression in conversation obtained by analyzing a generation rate or a generation pattern of at least one of a coherent sentence that is easy to understand, a filler, stammering, an unknown word, hesitation in saying, laziness in saying, and an onomatopoetic word.

The setting information acquisition unit 32 acquires setting information in accordance with an operation performed by a user of the voice recognition device 10. The setting information is information for determining whether to add the meta information to the text, and whether to add the relevant region of the material data to the text. The voice recognition device 10 accepts the setting information before processing of the voice recognition. The voice recognition device 10 may accept change of the setting information during processing of the voice recognition. The voice recognition device 10 may allow the user to change the generation rate of the meta information and the relevant region through a user interface such as a slider bar, for example.

The voice acquisition unit 34 acquires the voice signal representing a voice uttered by the object speaker. The voice acquisition unit 34 acquires the voice signal detected by a sound collecting device, for example.

The feature amount calculation unit 36 calculates a plurality of acoustic feature amounts representing a feature of the voice by analyzing the voice signal for each acoustic frame. The acoustic frame is a section of the voice signal for calculating the acoustic feature amount. The acoustic frames are set such that center times thereof are shifted from each other by a predetermined interval. For example, the feature amount calculation unit 36 calculates a basic frequency, a dynamic range, a volume, utterance speed, a silent period length, pitch, a Mel-Frequency Cepstrum Coefficient, and the like of the voice signal.

The recognition unit 38 recognizes the voice signal based on a plurality of acoustic feature amounts calculated by the feature amount calculation unit 36 to generate the text and the meta information. For example, the recognition unit 38 makes a search and the like using an acoustic model and a language model, and generates a text column and a meta information column.

The vector generation unit 40 acquires a plurality of acoustic feature amounts calculated by the feature amount calculation unit 36, the text and the meta information generated by the recognition unit 38, and various pieces of information generated during recognition processing performed by the recognition unit 38. The vector generation unit 40 analyzes these pieces of information to generate an object presentation vector.

The object presentation vector includes a plurality of parameters representing a feature of a presentation uttered by the object speaker. For example, when the voice recognition device 10 is applied to an information providing device for providing video and a voice of a lecturer of a seminar to people who attend the seminar, the object presentation vector includes a plurality of parameters representing a feature of the presentation uttered by the lecturer of the seminar.

Each of the plurality of parameters included in the object presentation vector is a value calculated through the same processing as a plurality of parameters included in the reference presentation vector. That is, each of the plurality of parameters included in the object presentation vector is calculated through the same arithmetic operation as the reference presentation vector, based on the voice signal uttered by the object speaker, and the text or the meta information obtained by recognizing the voice signal uttered by the object speaker. The plurality of parameters calculated as described above are included in the object presentation vector in the same format as in the reference presentation vector.

For example, the vector generation unit 40 generates the object presentation vector including information obtained by analyzing the acoustic feature amount of the voice signal uttered by the object speaker as a plurality of parameters. For example, the vector generation unit 40 generates the object presentation vector including at least one of a basic frequency, a dynamic range, a volume, utterance speed, a silent period length, pitch, and a Mel-Frequency Cepstrum Coefficient of the voice signal as a plurality of parameters. For example, the vector generation unit 40 may generate the object presentation vector including at least one of evaluation values representing stability of utterance speed, stability of sound volume, smoothness of speech, clearness of voice, a generation rate of silence, and unnaturalness of intonation that are calculated using at least one of a basic frequency, a dynamic range, a volume, utterance speed, a silent period length, pitch, and a Mel-Frequency Cepstrum Coefficient of the voice signal as a plurality of parameters.

For example, the vector generation unit 40 generates the object presentation vector including information obtained by analyzing the text or the meta information obtained by recognizing the voice signal uttered by the object speaker as a plurality of parameters. For example, the vector generation unit 40 generates the object presentation vector including a value representing a generation rate or a generation pattern of at least one of a coherent sentence that is easy to understand, a filler, an unknown word, stammering, hesitation in saying, laziness in saying, and an onomatopoetic word as a plurality of parameters. For example, the vector generation unit 40 may generate the object presentation vector including at least one of a generation rate of a technical term, a generation rate of repetition, and a generation rate of digression in conversation obtained by analyzing a generation rate or a generation pattern of at least one of a coherent sentence that is easy to understand, a filler, an unknown word, stammering, hesitation in saying, laziness in saying, and an onomatopoetic word as a plurality of parameters.

The comparison unit 42 acquires the reference presentation vector stored in the vector storage unit 30 and the object presentation vector generated by the vector generation unit 40. The comparison unit 42 calculates a similarity between the reference presentation vector and the object presentation vector.

For example, the comparison unit 42 calculates an inter-vector distance between the reference presentation vector and the object presentation vector, and may set the calculated inter-vector distance to be the similarity. For example, the comparison unit 42 may set, to be the similarity, a value that becomes 0 when the reference presentation vector is identical to the object presentation vector, and increases as the inter-vector distance between the reference presentation vector and the object presentation vector increases.

The output control unit 44 acquires the text and the meta information from the recognition unit 38. The output control unit 44 acquires the similarity from the comparison unit 42, and acquires the setting information from the setting information acquisition unit 32.

The output control unit 44 divides the text for each phrase and outputs the resultant text. The phrase is a unit for outputting the text. The phrase may be, for example, a sentence, or may be a plurality of collective sentences that are continuously spoken by the speaker. There may be a phrase in which the text is blank (for example, silence).

The output control unit 44 determines whether to output the meta information based on the similarity and the setting information for each phrase. If the meta information is determined to be output, the output control unit 44 outputs the meta information being added to corresponding text. That is, the output control unit 44 switches whether to output the meta information being added to the text based on the similarity and the setting information for each phrase.

The setting information may be a first control model for switching whether to add the meta information to the text based on the similarity. In this case, the output control unit 44 switches whether to add the meta information to the text based on the similarity and the first control model. For example, the first control model may be a model for determining whether to output the meta information by performing explicit conditional judgement. The first control model may be a stochastic model for stochastically determining whether to output the meta information.

For example, the setting information may include a first threshold. In this case, when the reference presentation vector and the object presentation vector are more similar than the first threshold, the output control unit 44 does not output the meta information. When the reference presentation vector and the object presentation vector are not more similar than the first threshold, the output control unit 44 adds the meta information to the text and outputs the meta information with the text.

The output control unit 44 determines whether to output the material data based on the similarity and the setting information for each phrase. If the material data is determined to be output, the output control unit 44 accesses the material storage unit 26 to identify a relevant region related to the corresponding text in the material data. For example, the output control unit 44 extracts a principal term (for example, a noun) of the text. Subsequently, the output control unit 44 searches a plurality of pieces of region information stored in the material storage unit 26 to extract a piece of region information including the principal term. Next, the output control unit 44 identifies the relevant region in the material data based on a position included in the extracted piece of region information. The output control unit 44 then acquires data representing the identified relevant region from the material storage unit 26.

If the material data is determined to be output, the output control unit 44 adds the acquired data representing the relevant region to the text and outputs the data with the text. That is, the output control unit 44 switches whether to output the material data being added to the text based on the similarity and the setting information for each phrase.

The setting information may be a second control model for switching whether to add the material data to the text based on the similarity. In this case, the output control unit 44 switches whether to add the material data (relevant region) to the text based on the similarity and the second control model. For example, the second control model may be a model for determining whether to output the material data (relevant region) by performing explicit conditional judgement. The second control model may be a stochastic model for stochastically determining whether to output the material data (relevant region).

For example, the setting information may include a second threshold. In this case, when the reference presentation vector and the object presentation vector are more similar than the second threshold, the output control unit 44 does not output the material data (relevant region). When the reference presentation vector and the object presentation vector are not more similar than the second threshold, the output control unit 44 adds the material data (relevant region) to the text and outputs the material data with the text.

In the present embodiment, the output control unit 44 causes a display unit to display the text, the meta information, and the material data (relevant region). For example, along with control for switching whether to output the meta information, the output control unit 44 may change a position at which the meta information is added to the text, at least one of a color, a font, and a size of the meta information, an icon representing the meta information, or an object representing the meta information in accordance with content of the meta information. The output control unit 44 may change at least one of display speed and residence time of the text in accordance with the content of the meta information.

Figure 2:
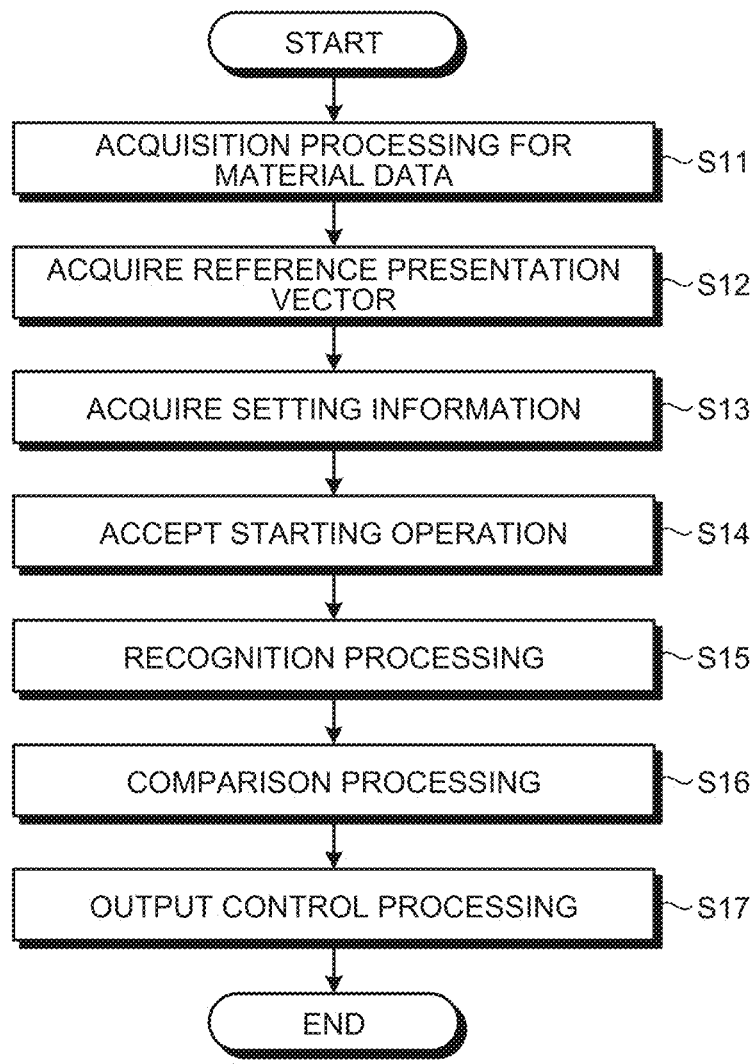
FIG. 2 is a flowchart illustrating a processing procedure of the voice recognition device.

FIG. 2 is a flowchart illustrating a processing procedure of the voice recognition device 10. First, at S11, the voice recognition device 10 performs acquisition processing for material data. Details about the acquisition processing for material data will be further described later with reference to FIG. 3.

Subsequently, at S12, the voice recognition device 10 acquires the reference presentation vector generated by another device, or generated by the voice recognition device 10. The voice recognition device 10 stores the acquired reference presentation vector in the vector storage unit 30.

Subsequently, at S13, the voice recognition device 10 acquires the setting information in accordance with an operation performed by the user. Next, at S14, the voice recognition device 10 accepts a starting operation performed by the user. After accepting the starting operation, the voice recognition device 10 starts processing at S15, S16, and S17.

At S15, the voice recognition device 10 performs recognition processing. Details about the recognition processing will be further described later with reference to FIG. 4.

At S16, the voice recognition device 10 performs comparison processing. Details about the comparison processing will be further described later with reference to FIG. 5.

At S17, the voice recognition device 10 performs output control processing. Details about the output control processing will be further described later with reference to FIG. 6.

After accepting an end operation performed by the user, the voice recognition device 10 ends the processing at S15, S16, and S17 to end the procedure in FIG. 2.

Figure 3:
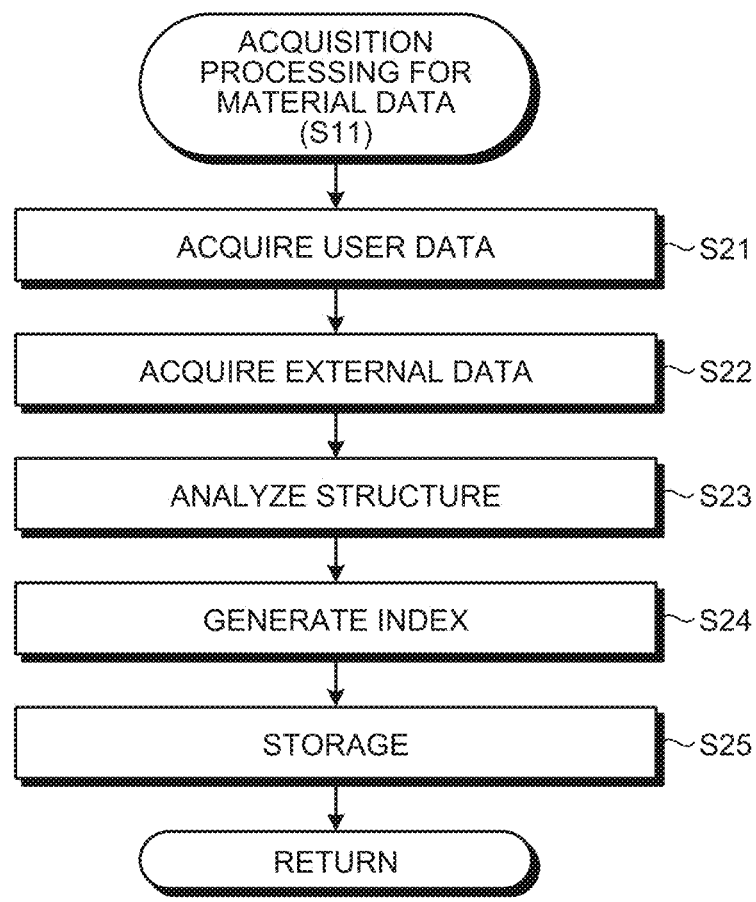
FIG. 3 is a flowchart illustrating a processing procedure of acquisition processing for material data (S11)

FIG. 3 is a flowchart illustrating a detailed processing procedure of the acquisition processing for material data (S11). The voice recognition device 10 performs the following processing from S21 to S25 in the acquisition processing for material data at S11.

At S21, the voice recognition device 10 acquires data (user data) obtained by electronizing materials, proceedings, and the like prepared by the object speaker. Subsequently, at S22, the voice recognition device 10 acquires, from the server, information (external data) related to a voice uttered by the object speaker other than the user data by searching the Internet and the like.

Subsequently, at S23, the voice recognition device 10 analyzes a structure of the acquired material data (the user data and the external data). The voice recognition device 10 divides the material data into a plurality of regions that can be added to the text and output in accordance with an analysis result. The voice recognition device 10 extracts, for each of the regions, the text representing content thereof.

Subsequently, at S24, the voice recognition device 10 identifies, for each of the regions, a position in the material data (a file name, a page number, a row number, identification information representing whether the region is a title or a body, and the like). The voice recognition device 10 then generates a search index for each of the regions.

Subsequently, at S25, the voice recognition device 10 generates the region information including the text, the position, and the index for each of the regions. The voice recognition device 10 stores, in the material storage unit 26, the material data and the region information of each of the regions generated by the analysis unit 24. After ending the processing at S25, the voice recognition device 10 ends the procedure in FIG. 3.

Figure 4:
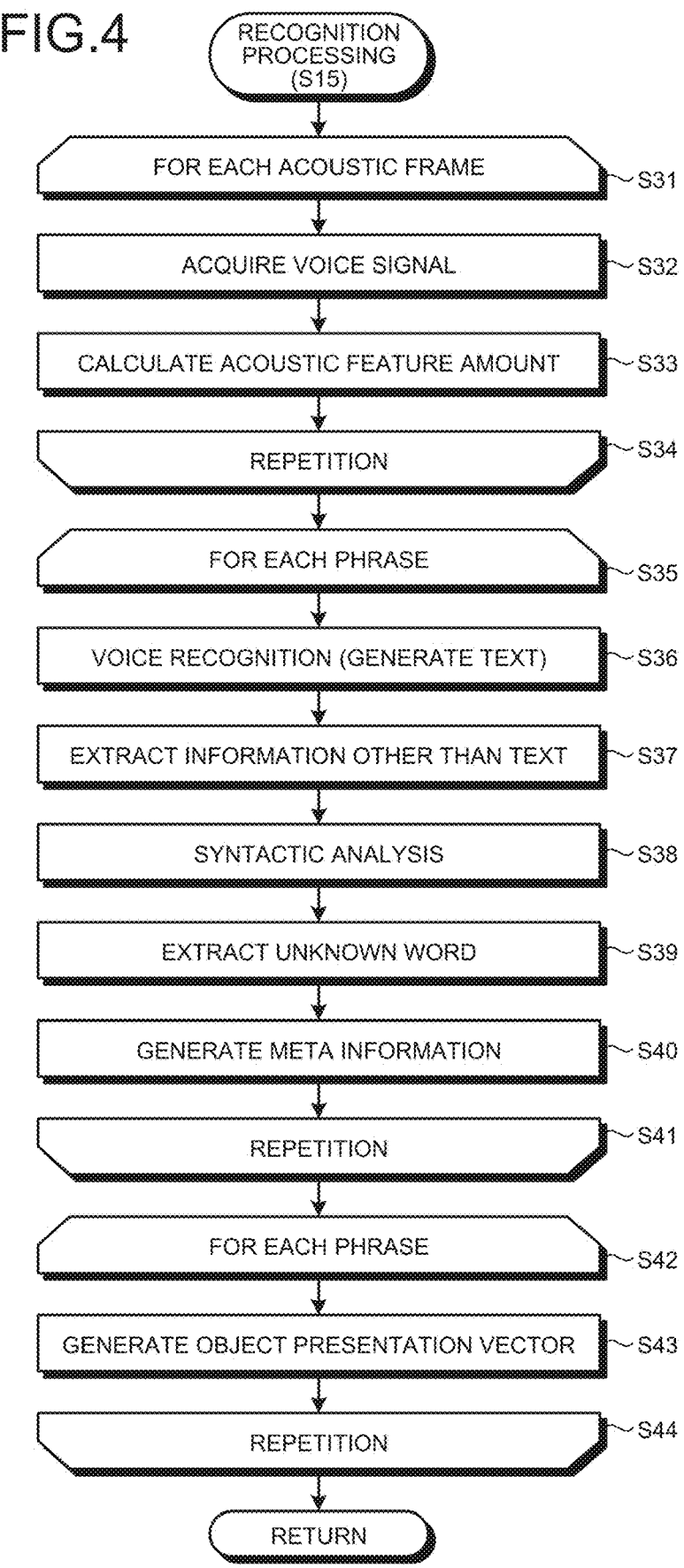
FIG. 4 is a flowchart illustrating a processing procedure of recognition processing (S15)

FIG. 4 is a flowchart illustrating a detailed processing procedure in the recognition processing (S15). The voice recognition device 10 performs the following processing from S31 to S44 in the recognition processing at S15.

In loop processing between S31 and S34, the voice recognition device 10 performs processing at S32 and S33 for each acoustic frame. The voice recognition device 10 performs the loop processing between S31 and S34 until the user performs an end operation. At S32, the voice recognition device 10 acquires the voice signal representing the voice uttered by the object speaker. At S33, the voice recognition device 10 analyzes the voice signal to calculate a plurality of acoustic feature amounts representing features of the voice. For example, the voice recognition device 10 calculates a basic frequency, a dynamic range, a volume, utterance speed, a silent period length, pitch, a Mel-Frequency Cepstrum Coefficient, and the like of the voice signal.

Subsequently, in loop processing between S35 and S41, the voice recognition device 10 performs processing from S36 to S40 for each phrase. The phrase is a unit for outputting the text, and may be one sentence or a plurality of collective sentences that are continuously spoken by the speaker. The voice recognition device 10 performs the loop processing between S35 and S41 until the user performs an end operation.

At S36, the voice recognition device 10 recognizes the voice signal based on the acoustic feature amounts calculated at S33, and generates the text. Subsequently, at S37, the voice recognition device 10 extracts information other than the text included in the voice signal based on the acoustic feature amounts calculated at S33. For example, the voice recognition device 10 extracts feelings, a filler, stammering, hesitation in saying, laziness in saying, a silence period, and the like of the object speaker.

Subsequently, at S38, the voice recognition device 10 performs syntactic analysis on the text generated at S36. Next, at S39, the voice recognition device 10 performs processing for extracting an unknown word on the text generated at S36.

Subsequently, at S40, the voice recognition device 10 generates the meta information. For example, the voice recognition device 10 generates the meta information including at least one of a volume of the voice signal, utterance speed, and feelings, a filler, stammering, hesitation in saying, laziness in saying, a silence period, and the like of the object speaker detected from the voice signal.

Subsequently, in loop processing between S42 and S44, the voice recognition device 10 performs the processing at S42 for each phrase. The voice recognition device 10 performs the loop processing between S42 and S44 until the user performs an end operation.

At S43, the voice recognition device 10 acquires the acoustic feature amounts extracted through the processing at S33, and the text, the meta information, and other various pieces of information generated through the processing from S36 to S40. The voice recognition device 10 analyzes these pieces of information to generate the object presentation vector.

The voice recognition device 10 then ends the procedure in FIG. 4 when the user performs an end operation.

Figure 5:
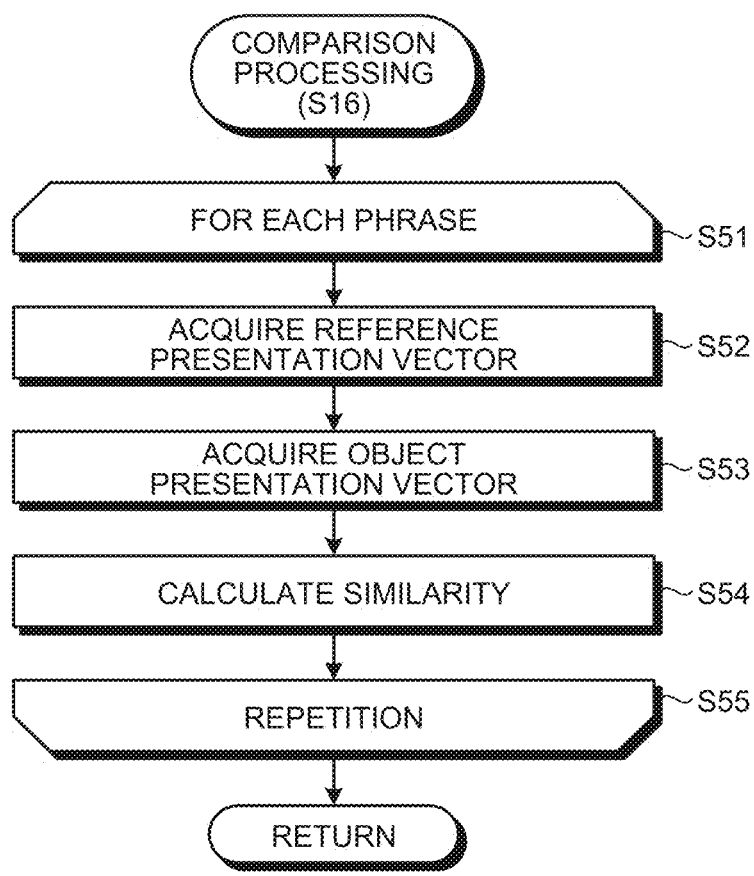
FIG. 5 is a flowchart illustrating a processing procedure of comparison processing (S16)

FIG. 5 is a flowchart illustrating a detailed processing procedure of the comparison processing (S16). The voice recognition device 10 performs the following processing from S51 to S55 in the comparison processing at S16.

In loop processing between S51 and S55, the voice recognition device 10 performs the processing at S52, S53, and S54 for each phrase. The voice recognition device 10 performs the loop processing between S51 and S55 until the user performs an end operation.

At S52, the voice recognition device 10 reads out and acquires the reference presentation vector from the vector storage unit 30. Subsequently, at S53, the voice recognition device 10 acquires the object presentation vector generated at S43.

Next, at S54, the voice recognition device 10 calculates the similarity between the reference presentation vector and the object presentation vector. For example, the voice recognition device 10 calculates an inter-vector distance between the reference presentation vector and the object presentation vector, and sets the calculated inter-vector distance to be the similarity. For example, the voice recognition device 10 may set, to be the similarity, a value that becomes 0 when the reference presentation vector is identical to the object presentation vector, and increases as the inter-vector distance between the reference presentation vector and the object presentation vector increases.

The voice recognition device 10 then ends the procedure in FIG. 5 when the user performs an end operation.

Figure 6:
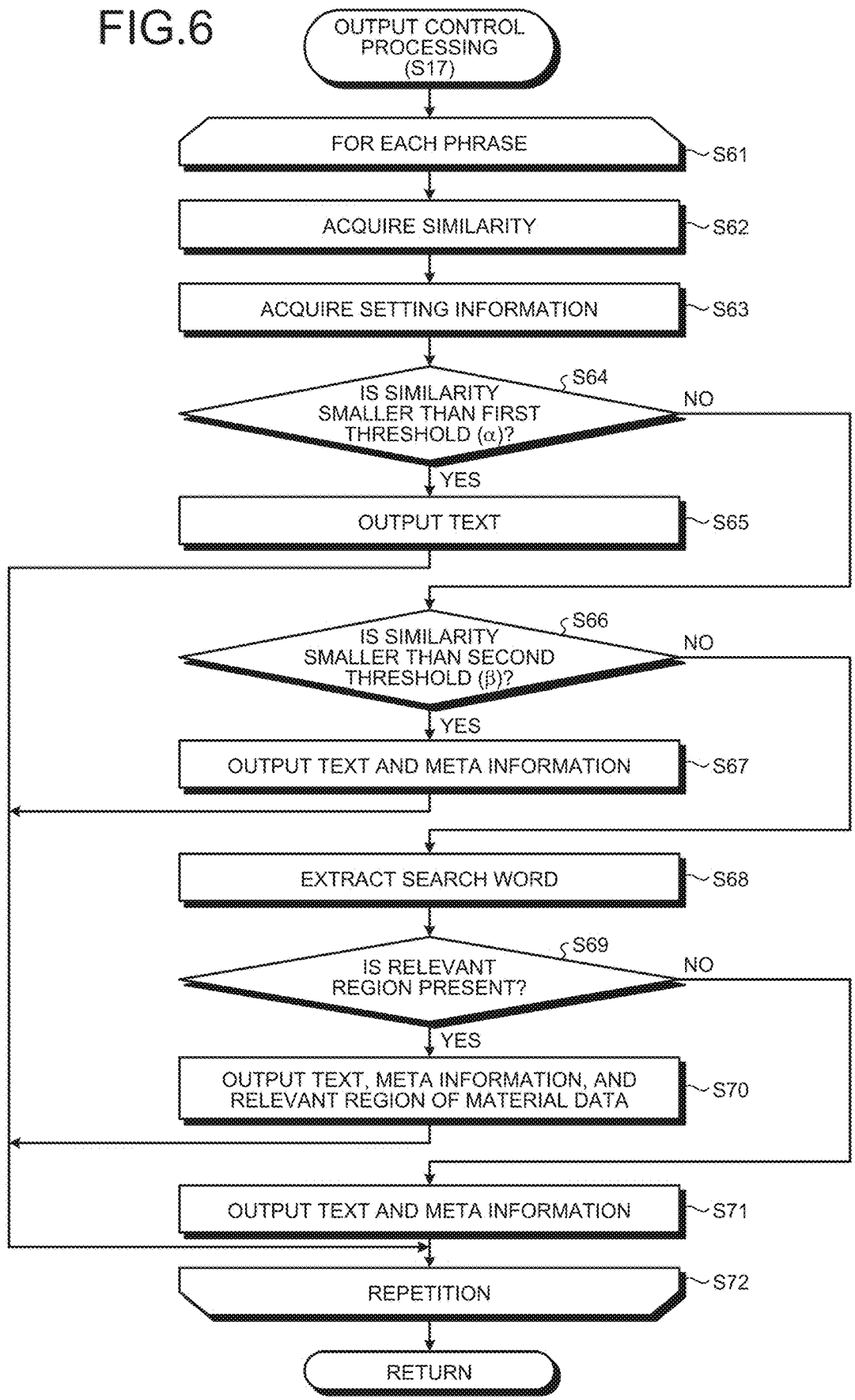
FIG. 6 is a flowchart illustrating a processing procedure of output control processing (S17)

FIG. 6 is a flowchart illustrating a detailed processing procedure of the output control processing (S17). The voice recognition device 10 performs the following processing from S61 to S72 in the output control processing at S17.

In loop processing between S61 and S72, the voice recognition device 10 performs processing from S62 to S71 for each phrase. The voice recognition device 10 performs the loop processing between S61 and S72 until the user performs an end operation.

At S62, the voice recognition device 10 acquires the similarity calculated in processing for calculating the similarity (S54). In this example, the voice recognition device 10 acquires, as the similarity, a value that becomes 0 when the reference presentation vector is identical to the object presentation vector, and increases as the inter-vector distance between the reference presentation vector and the object presentation vector increases.

Subsequently, at S63, the voice recognition device 10 acquires the setting information. In this example, the voice recognition device 10 acquires a first threshold ($\alpha$) and a second threshold ($\beta$). The first threshold ($\alpha$) is larger than 0 and smaller than the second threshold ($\beta$). The voice recognition device 10 may accept change of the setting information from the user during processing of voice recognition. For example, the voice recognition device 10 accepts change of the first threshold ($\alpha$) and the second threshold ($\beta$) through a user interface such as a slider bar.

Subsequently, at S64, the voice recognition device 10 determines whether the similarity is smaller than the first threshold ($\alpha$). If the similarity is smaller than the first threshold ($\alpha$) (Yes at S64), the voice recognition device 10 outputs corresponding text at S65. That is, if the reference presentation vector and the object presentation vector are more similar than the first threshold ($\alpha$), the voice recognition device 10 outputs the text without adding the meta information and the relevant region of the material data thereto. After ending the processing at S65, the voice recognition device 10 returns the process to S62, and advances the process for the next phrase.

If the similarity is not smaller than the first threshold ($\alpha$) (No at S64), the voice recognition device 10 advances the process to S66. At S66, the voice recognition device 10 determines whether the similarity is smaller than the second threshold ($\beta$).

If the similarity is smaller than the second threshold ($\beta$) (Yes at S66), the voice recognition device 10 adds corresponding meta information to the corresponding text and outputs the meta information with the text at S67. That is, when the reference presentation vector and the object presentation vector are more similar than the second threshold ($\beta$), the voice recognition device 10 adds the meta information to the text and outputs the meta information with the text without adding the relevant region of the material data thereto. After ending the processing at S67, the voice recognition device 10 returns the process to S62, and advances the process for the next phrase.

If the similarity is not smaller than the second threshold ($\beta$) (No at S66), the voice recognition device 10 advances the process to S68. At S68, the voice recognition device 10 extracts a search word from the corresponding text. For example, the voice recognition device 10 extracts a principal term (for example, a noun) in the corresponding text as a search word.

Subsequently, at S69, the voice recognition device 10 searches a plurality of pieces of region information stored in the material storage unit 26 to determine whether the relevant region including the text identical to or approximate to the search word is present in the material data. If the relevant region is present in the material data (Yes at S69), the voice recognition device 10 advances the process to S70. If the relevant region is not present in the material data (No at S69), the voice recognition device 10 advances the process to S71.

At S70, the voice recognition device 10 adds corresponding meta information and corresponding relevant information to the corresponding text and outputs the meta information and relevant information with the text. That is, when the reference presentation vector and the object presentation vector are not more similar than the second threshold (β), the voice recognition device 10 adds the meta information and the relevant region of the material data to the text and outputs the meta information and the relevant region with the text. After ending the process at S70, the voice recognition device 10 returns the process to S62, and advances the process for the next phrase.

At S71, the voice recognition device 10 adds the corresponding meta information to the corresponding text and outputs the meta information with the text. That is, even when the reference presentation vector and the object presentation vector are not more similar than the second threshold (β), the voice recognition device 10 adds the meta information to the text and outputs the meta information with the text without adding the relevant region of the material data thereto when the relevant region of the material data is not present. After ending the process at S71, the voice recognition device 10 returns the process to S62, and advances the process for the next phrase.

The voice recognition device 10 then ends the procedure in FIG. 6 when the user performs an end operation.

FIG. 7 is a diagram illustrating a display example of the text, the meta information, and the relevant region of the material data output from the voice recognition device 10. The voice recognition device 10 causes the display unit to display the text obtained by recognizing the voice signal representing the voice uttered by the object speaker for each phrase. In the example of FIG. 7, the voice recognition device 10 displays text such as "I will explain a relation between the market and a commodity", "Sales performance of necessities of life is hardly influenced by the market", "Sales performance of automobiles is xxxxxxxxxx influenced by the market", "The market is . . . very slow recently", and "Thus, uh, you can probably make a profit by selling xxxxxxxxxxx". In the text, "x" represents a character that cannot be recognized or an unclear character that is erroneously recognized. Accordingly, the voice recognition device 10 can convey content of the voice of the object speaker to a user and the like who can hardly hear the voice of the object speaker.

Additionally, the voice recognition device 10 displays the meta information being added to the text. In the example of FIG. 7, the voice recognition device 10 displays the meta information such as "loud voice", "unclear because of rapid speech", "silence", and "unclear because of a low voice". Accordingly, the voice recognition device 10 can convey, to the user and the like who can hardly hear the voice of the object speaker, a condition, feelings, and personality of the object speaker, realism of the presentation, and the like that cannot be conveyed with the text.

Additionally, the voice recognition device 10 displays the relevant region of the material data being added to the text. In the example of FIG. 7, the voice recognition device 10 displays information surrounded by a rectangular frame ("a list of commodities the sales performances of which are easily influenced by the market") as the relevant region of the material data. Accordingly, the voice recognition device 10 can convey, to the user, information that is hardly recognized and the content of which cannot be conveyed in the text and the meta information, additional information, and the like.

The voice recognition device 10 compares the reference presentation vector including a plurality of types of parameters representing a feature of the presentation uttered by the reference speaker with the object presentation vector including a plurality of types of parameters representing a feature of the presentation uttered by the object speaker to control a display rate of the meta information and a display rate of the relevant region of the material data. Specifically, the voice recognition device 10 performs control to reduce the display rate of the meta information and the relevant information when the object presentation vector is closer to the reference presentation vector, and increase the display rate of the meta information and the relevant information when the object presentation vector is farther from the reference presentation vector. Accordingly, when the object speaker makes a presentation more similar to that of the reference speaker as a model, for example, the voice recognition device 10 can reduce the display rate of the meta information and the relevant region. When the object speaker makes a presentation more different from that of the reference speaker, the voice recognition device 10 can increase the display rate of the meta information and the relevant region.

The voice recognition device 10 can control such a display rate of the meta information and the relevant region in accordance with an operation performed by the user. For example, when the user feels that a generation frequency of the meta information and the relevant region is high, the user can reduce the generation frequency of the meta information and the relevant region by operating the voice recognition device 10. In contrast, when the user feels that the generation frequency of the meta information and the relevant region is low, the user can increase the generation frequency of the meta information and the relevant region by operating the voice recognition device 10. Accordingly, the voice recognition device 10 can generate the meta information and the relevant region with appropriate frequency in accordance with a personal feeling of the user.

When the relevant region of the material data is displayed, the voice recognition device 10 may add an indentation or a quotation mark thereto so that a reference source can be seen. When the relevant region of the material data is displayed, the voice recognition device 10 may show a basis of an origin by displaying a file format and the like. Accordingly, the voice recognition device 10 can visually show the user the relevant region does not mean that speech itself is output but show the basis of the origin of the relevant region.

The voice recognition device 10 may change a position at which the meta information is added to the text, at least one of a color, a font, and a size of the meta information, an icon representing the meta information, or an object representing the meta information in accordance with the content of the meta information. The voice recognition device 10 may change at least one of the display speed and the residence time of the text in accordance with the content of the meta information. By doing so, the voice recognition device 10 can show the user, with more emphasis, a condition, feelings, and personality of the object speaker, realism of the presentation, and the like.

As described above, the voice recognition device 10 according to the present embodiment recognizes the voice signal representing the voice uttered by the object speaker, and can appropriately output the information not included in the text (the meta information and the relevant region of the material data) together with the text.

Figure 8:
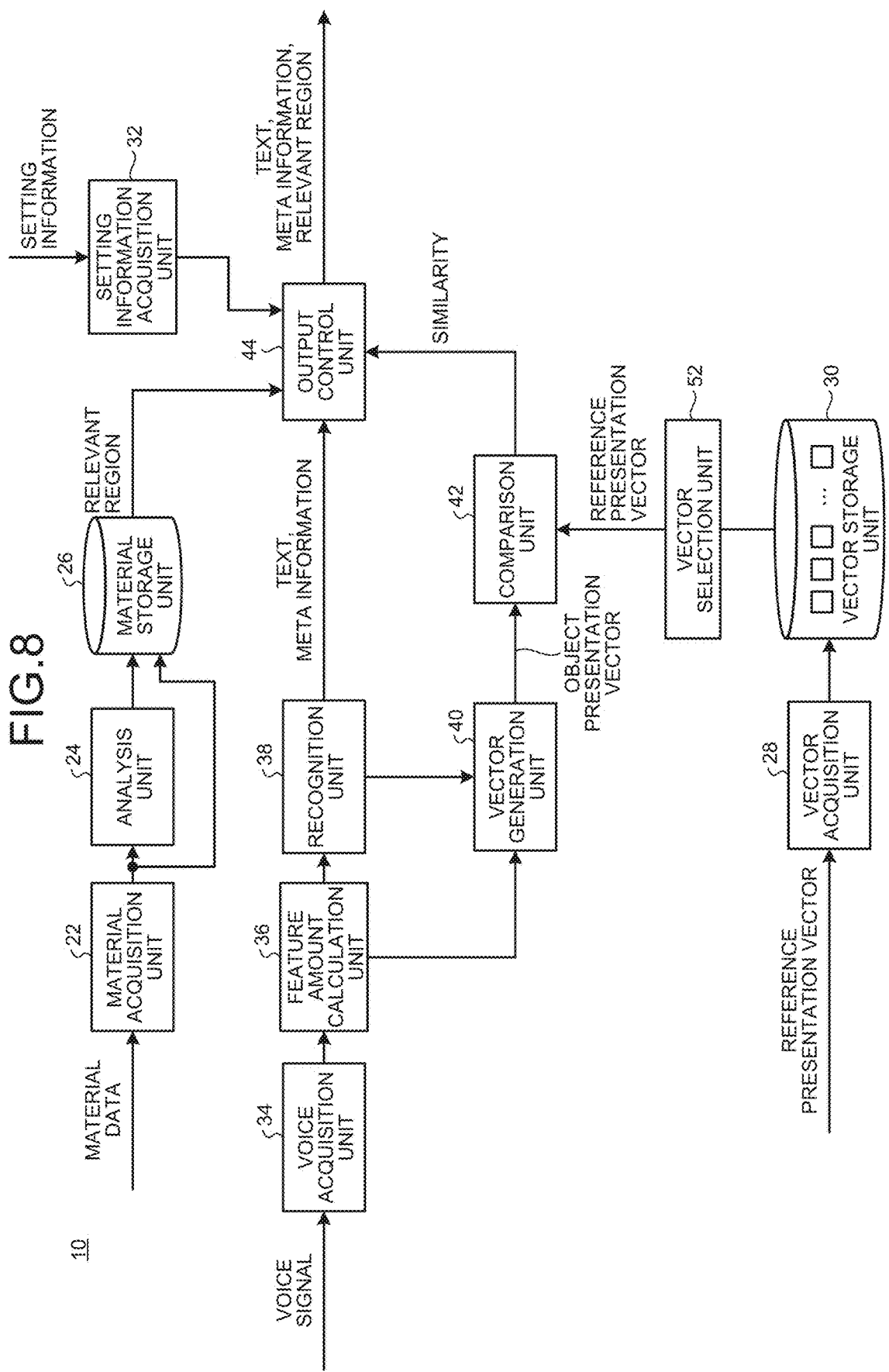
FIG. 8 is a diagram illustrating a configuration of a voice recognition device according to a modification.

FIG. 8 is a diagram illustrating a configuration of the voice recognition device 10 according to a modification. The voice recognition device 10 according to the modification further includes a vector selection unit 52.

The vector storage unit 30 according to the modification stores therein a plurality of reference presentation vectors obtained when the reference speakers speak in a plurality of different situations. For example, the vector storage unit 30 stores therein a reference presentation vector for a teacher obtained when a teacher speaks in a classroom, a reference presentation vector for a seminar obtained when a lecturer of a seminar speaks, a reference presentation vector for announcing a new product obtained when a presenter of a new product speaks, and the like. The vector storage unit 30 may further store therein a reference presentation vector for other applications.

The vector selection unit 52 selects any one of a plurality of reference presentation vectors stored in the vector storage unit 30 in accordance with a mode set in advance. The comparison unit 42 according to the modification calculates the similarity between the reference presentation vector selected by the vector selection unit 52 and the object presentation vector.

Accordingly, the voice recognition device 10 according to the modification can appropriately output information not included in the text (the meta information and the relevant region of the material data) in accordance with an application scene.

Figure 9:
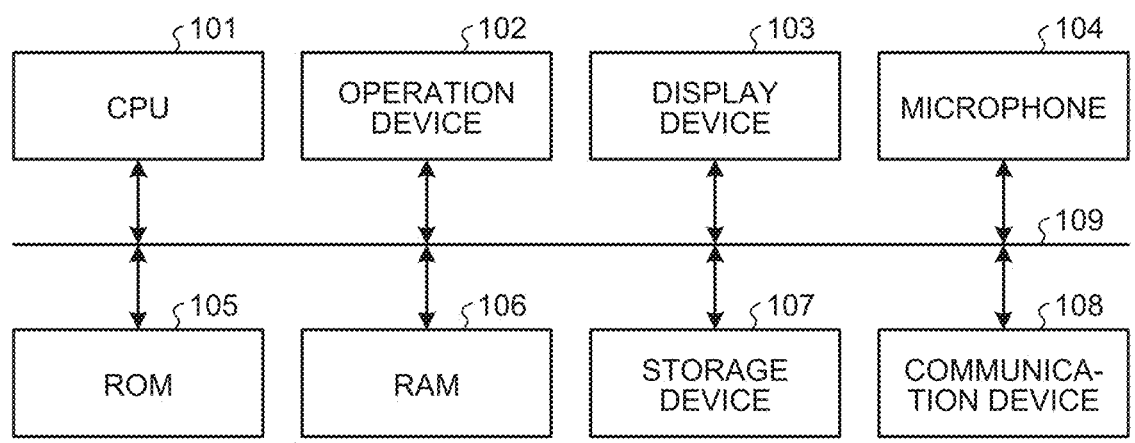
FIG. 9 is a hardware block diagram of the voice recognition device.

FIG. 9 is a hardware block diagram of the voice recognition device 10. By way of example, the voice recognition device 10 is implemented with a hardware configuration similar to a typical computer (information processing device). The voice recognition device 10 includes a central processing unit (CPU) 101, an operation device 102, a display device 103, a microphone 104, a read only memory (ROM) 105, a random access memory (RAM) 106, a storage device 107, a communication device 108, and a bus 109. The components are connected to one another via the bus 109.

The CPU 101 performs various pieces of processing in cooperation with various computer programs stored in the ROM 105 or the storage device 107 in advance using a predetermined region of the RAM 106 as a working area, and controls operations of the components constituting the voice recognition device 10 in a centralized manner. The CPU 101 also causes the operation device 102, the display device 103, the microphone 104, the communication device 108, and the like to operate in cooperation with the computer program stored in the ROM 105 or the storage device 107 in advance.

The operation device 102 is an input device such as a mouse and a keyboard, which accepts the information operated and input by the user as an instruction signal, and outputs the instruction signal to the CPU 101.

The display device 103 is a display unit such as a liquid crystal display (LCD). The display device 103 displays various pieces of information based on a display signal from the CPU 101. For example, the display device 103 displays the text, the meta information, and the relevant region of the material data. The display device 103 may also display a user interface such as a slider bar for inputting setting information. In a case of outputting the text, the meta information, and the relevant region of the material data to the communication device 108, the storage device 107, or the like, the voice recognition device 10 does not necessarily include the display device 103.

The microphone 104 is a device for inputting a voice signal. In a case of recognizing a voice signal recorded in advance or a voice signal input from the communication device 108, the voice recognition device 10 does not necessarily include the microphone 104.

The ROM 105 stores therein the computer program, various pieces of setting information, and the like used for controlling the voice recognition device 10 in an unrewritable manner. The RAM 106 is a volatile storage medium such as a synchronous dynamic random access memory (SDRAM). The RAM 106 functions as a working area of the CPU 101.

The storage device 107 is a rewritable recording device such as a storage medium constituted of a semiconductor such as a flash memory, a storage medium that can magnetically or optically record data, and the like. The storage device 107 stores therein a computer program used for controlling the voice recognition device 10. The storage device 107 functions as the material storage unit 26 and the vector storage unit 30.

The communication device 108 acquires the material data from the server. The communication device 108 communicates with an external device, and outputs the text, the meta information, the relevant region of the material data, and the like.

The computer program executed by the voice recognition device 10 according to the present embodiment is recorded and provided in a computer-readable recording medium such as a compact disc read only memory (CD-ROM), a flexible disk (FD), a compact disc recordable (CD-R), and a digital versatile disc (DVD), as an installable or executable file.

The computer program executed by the voice recognition device 10 according to the present embodiment may be stored in a computer connected to a network such as the Internet and provided by being downloaded via the network. Furthermore, the computer program executed by the voice recognition device 10 according to the present embodiment may be provided or distributed via a network such as the Internet. The computer program executed by the voice recognition device 10 according to the present embodiment may be embedded and provided in a ROM, for example.

The computer program executed by the voice recognition device 10 according to the present embodiment has a module configuration including a material acquisition module, an analysis module, a vector acquisition module, a setting information acquisition module, a voice acquisition module, a feature amount calculation module, a recognition module, a vector generation module, a comparison module, and an output control module. The CPU 101 (processor) reads out such a computer program from the storage medium and the like, and loads each of the modules described above into the RAM 106 (main storage device). By executing such a computer program, the CPU 101 (processor) functions as the material acquisition unit 22, the analysis unit 24, the vector acquisition unit 28, the setting information acquisition unit 32, the voice acquisition unit 34, the feature amount calculation unit 36, the recognition unit 38, the vector generation unit 40, the comparison unit 42, and the output control unit 44. Part or all of the material acquisition unit 22, the analysis unit 24, the vector acquisition unit 28, the setting information acquisition unit 32, the voice acquisition unit 34, the feature amount calculation unit 36, the recognition unit 38, the vector generation unit 40, the comparison unit 42, and the output control unit 44 may be configured as hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voice recognition device comprising:
one or more processors configured to:
recognize a voice signal representing a voice uttered by an object speaker, to generate text and meta information representing information that is not included in the text and included in the voice signal;
generate an object presentation vector including a plurality of parameters representing a feature of a presentation uttered by the object speaker based on the voice signal, the text, and the meta information;
calculate, for each phrase that is a unit for outputting the text, a similarity between the object presentation vector and a reference presentation vector including the plurality of parameters representing a feature of a presentation uttered by a reference speaker; and
display, for the each phrase, the text on a display device; and
acquire material data related to the voice uttered by the object speaker,
wherein the one or more processors are further configured to:
for the each phrase,
when the similarity is indicative of being more similar than a preset first threshold, display the text on the display device without adding the meta information;
when the similarity is indicative of being more dissimilar than the first threshold and being more similar than a preset second threshold that is more dissimilar than the first threshold, add the meta information to the text to be displayed on the display device; and
when the similarity is indicative of being more dissimilar than the second threshold, extract a relevant region to the text in the material data, wherein
when the relevant region is present in the material data, add the meta information and the relevant region to the text to be displayed on the display device, and
when the relevant region is not present in the material data, add the meta information to the text to be displayed on the display device,
and
wherein the meta information comprises at least one of a volume of the voice signal, utterance speed, feelings, a filler, stammering, hesitation in saying, laziness in saying, or a silence period.

2. The device according to claim 1, wherein the one or more processors are further configured to:
determine whether to output the relevant region of the material data corresponding to the text based on the similarity; and
upon determining to output the relevant region, add the relevant region to the text and output the relevant region with the text.

3. The device according to claim 1, wherein the plurality of parameters include information obtained by analyzing an acoustic feature amount of the voice signal.

4. The device according to claim 3, wherein the plurality of parameters include at least two of a basic frequency, a dynamic range, a volume, utterance speed, a silent period length, or pitch of the voice signal.

5. The device according to claim 3, wherein the plurality of parameters include at least one of evaluation values representing stability of utterance speed, stability of sound volume, smoothness of speech, clearness of voice, a generation rate of silence, or unnaturalness of intonation that are calculated using at least one of the basic frequency, the dynamic range, the volume, the utterance speed, the silent period length, or the pitch of the voice signal.

6. The device according to claim 1, wherein the plurality of parameters include information obtained by analyzing the text or the meta information.

7. The device according to claim 6, wherein the plurality of parameters include a value representing a generation rate or a generation pattern of at least one of a coherent sentence that is easy to understand, a filler, an unknown word, stammering, hesitation in saying, laziness in saying, and an onomatopoetic word.

8. The device according to claim 6, wherein the plurality of parameters include at least one of a generation rate of a technical term, a generation rate of repetition, and a generation rate of digression in conversation obtained by analyzing a generation rate or a generation pattern of at least one of a coherent sentence that is easy to understand, a filler, an unknown word, stammering, hesitation in saying, laziness in saying, and an onomatopoetic word.

9. The device according to claim 1, wherein
the one or more processors are further configured to acquire setting information including a first threshold, and
the one or more processors are configured to:
output the text without adding the meta information when the reference presentation vector and the object presentation vector are more similar than the first threshold, and
add the meta information to the text and output the meta information with the text when the reference presentation vector and the object presentation vector are not more similar than the first threshold.

10. The device according to claim 1, further comprising a vector storage unit configured to store therein a plurality of reference presentation vectors obtained when reference speakers speak in a plurality of different situations, wherein
the one or more processors are further configured to select any one of the plurality of reference presentation vectors in accordance with a mode set in advance, and
the one or more processors are configured to calculate the similarity between the selected reference presentation vector and the object presentation vector.

11. The device according to claim 1, wherein the one or more processors are configured to cause a display unit to display the text and the meta information.

12. The device according to claim 11, wherein the one or more processors are configured to change a position at which the meta information is added to the text, at least one of a color, a font, and a size of the meta information, an icon representing the meta information, or an object representing the meta information in accordance with content of the meta information.

13. The device according to claim 11, wherein the one or more processors are configured to change at least one of display speed and residence time of the text in accordance with content of the meta information.

14. The voice recognition device of claim 1, wherein the one or more processors are further configured to,
when the similarity is indicative of being more dissimilar than the second threshold, extract a search word, as a principal term, from the text, and extract, as the relevant region, a portion including text in the material data that is identical to or approximate to the search word.

15. A voice recognition method executed by an information processing device, the voice recognition method comprising:
recognizing a voice signal representing a voice uttered by an object speaker, to generate text and meta information representing information that is not included in the text and included in the voice signal;
generating an object presentation vector including a plurality of parameters representing a feature of a presentation uttered by the object speaker based on the voice signal, the text, and the meta information;
calculating, for each phrase that is a unit for outputting the text, a similarity between the object presentation vector and a reference presentation vector including the plurality of parameters representing a feature of a presentation uttered by a reference speaker;
displaying, for the each phrase, the text on a display device; and
acquiring material data related to the voice uttered by the object speaker, wherein, for the each phrase:
when the similarity is indicative of being more similar than a preset first threshold, displaying the text on the display device without adding the meta information;
when the similarity is indicative of being more dissimilar than the first threshold and being more similar than a preset second threshold that is more dissimilar than the first threshold, adding the meta information to the text to be displayed on the display device; and
when the similarity is indicative of being more dissimilar than the second threshold, extracting a relevant region to the text in the material data, wherein
when the relevant region is present in the material data, adding the meta information and the relevant region to the text to be displayed on the display device, and
when the relevant region is not present in the material data, adding the meta information to the text to be displayed on the display device,
and
wherein the plurality of parameters include at least one of a basic frequency, a dynamic range, a volume, utterance speed, a silent period length, or pitch of the voice signal.

16. A computer program product having a non-transitory computer readable medium including programmed instructions, the instructions causing a computer to execute:
recognizing a voice signal representing a voice uttered by an object speaker, to generate text and meta information representing information that is not included in the text and included in the voice signal;
generating an object presentation vector including a plurality of parameters representing a feature of a presentation uttered by the object speaker based on the voice signal, the text, and the meta information;
calculating, for each phrase that is a unit for outputting the text, a similarity between the object presentation vector and a reference presentation vector including the plurality of parameters representing a feature of a presentation uttered by a reference speaker;
displaying, for the each phrase, the text on a display device; and
acquiring material data related to the voice uttered by the object speaker,
wherein the instructions further cause the computer to execute, for the each phrase:
when the similarity is indicative of being more similar than a preset first threshold, displaying the text on the display device without adding the meta information;
when the similarity is indicative of being more dissimilar than the first threshold and being more similar than a preset second threshold that is more dissimilar than the first threshold, adding the meta information to the text to be displayed on the display device; and
when the similarity is indicative of being more dissimilar than the second threshold, extracting a relevant region to the text in the material data, wherein
when the relevant region is present in the material data, adding the meta information and the relevant region to the text to be displayed on the display device, and
when the relevant region is not present in the material data, adding the meta information to the text to be displayed on the display device,
wherein the plurality of parameters include at least one of a basic frequency, a dynamic range, a volume, utterance speed, a silent period length, or pitch of the voice signal.

17. A voice recognition device comprising:
one or more processors configured to:
recognize a voice signal representing a voice uttered by an object speaker to generate text and meta information representing information that is not included in the text and included in the voice signal;
generate an object presentation vector including a plurality of parameters representing a feature of a presentation uttered by the object speaker based on the voice signal, the text, and the meta information;
calculate, for each phrase that is a unit for outputting the text, a similarity between the object presentation vector and a reference presentation vector including the plurality of parameters representing a feature of a presentation uttered by a reference speaker;
acquire material data related to the voice uttered by the object speaker;
for the each phrase,
when the similarity is indicative of being more similar than a preset first threshold, display the text on a display device without adding the meta information;
when the similarity is indicative of being more dissimilar than the first threshold and being more similar than a preset second threshold that is more dissimilar than the first threshold, add the meta information to the text to be displayed on the display device; and
when the similarity is indicative of being more dissimilar than the second threshold, extract a relevant region to the text in the material data, wherein
when the relevant region is present in the material data, add the meta information and the relevant region to the text to be displayed on the display device, and when the relevant region is not present in the material data, add the meta information to the text to be displayed on the display device; and output the text and the relevant region.

18. The voice recognition device of claim 17, wherein the material data comprises an image or a moving image representative of data related to the voice.

19. The voice recognition device of claim 17, wherein the material data comprises a file name, a page number, a row number, or identification information representing whether the region is a title or a body.

20. The voice recognition device of claim 17, wherein the meta information comprises at least one of a volume of the voice signal, utterance speed, feelings, a filler, stammering, hesitation in saying, laziness in saying, or a silence period.

* * * * *